United States Patent [19]

Ingle

[11] Patent Number: 5,055,511
[45] Date of Patent: Oct. 8, 1991

[54] MASTIC AND CAULKING COMPOSITIONS

[75] Inventor: David M. Ingle, Temple City, Calif.

[73] Assignee: Union Oil Company of California, Los Angeles, Calif.

[21] Appl. No.: 187,859

[22] Filed: Apr. 29, 1988

Related U.S. Application Data

[63] Continuation-in-part of Ser. No. 903,779, Sep. 4, 1986, Pat. No. 4,855,349.

[51] Int. Cl.$^5$ .............................................. C08K 3/10
[52] U.S. Cl. ................................. 524/406; 524/407; 524/414; 524/416; 524/417; 524/420; 524/432; 524/435
[58] Field of Search ............... 524/127, 406, 407, 414, 524/416, 417, 420, 432, 435

[56] References Cited

U.S. PATENT DOCUMENTS

| | | | |
|---|---|---|---|
| 3,345,336 | 10/1967 | Kuhlkamp et al. | 525/328.6 |
| 3,459,790 | 8/1969 | Smith | 560/178 |
| 3,488,708 | 1/1970 | Smith | 430/536 |
| 3,554,987 | 1/1971 | Smith | 526/240 |
| 3,607,834 | 9/1971 | Marx et al. | 524/357 |
| 3,658,878 | 4/1972 | Smith | 558/442 |
| 4,296,226 | 10/1981 | Braun et al. | 529/558 |
| 4,408,018 | 10/1983 | Bartman | 525/300 |
| 4,421,889 | 12/1983 | Braun et al. | 524/381 |
| 4,855,349 | 8/1989 | Ingle | 524/558 X |

FOREIGN PATENT DOCUMENTS 1144486 3/1969 United Kingdom .
1541909 3/1979 United Kingdom .

OTHER PUBLICATIONS

D. A. Upson, "Journal of Polymer Science: Polymer Symposium", John Wiley and Sons, Inc., 1985, 72 (pp. 45–54).
CA 106:1216952, Aug. 20, 1986, Showa Derko "Protecting Layer Forming Agents for Paper Processed Surface".

Primary Examiner—Joseph L. Schofer
Assistant Examiner—J. M. Reddick
Attorney, Agent, or Firm—Gregory F. Wirzbicki; Shlomo R. Frieman; Richard G. Jackson

[57] ABSTRACT

Permanently flexible and non-tacky coating mastic and caulking compositions having improved heat-age stability contain (a) at least one polymer having a $T_g$ of about $-50°$ C. to about $-10°$ C. and pendant functional groups attached to the polymer backbone and having the formula:

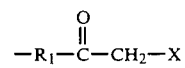

in which $R_1$ is a divalent organic radical at least 3 atoms in length, and X is organoacyl or cyano; (b) a zinc-containing pigment (e.g. zinc oxide); and (c) a polyphosphate anion in an amount effective for increasing the wet adhesion of the compositions, particularly of aged compositions. The mastics and caulks typically have total non-volatile matter concentrations of about 60 to about 90 weight percent of which about 15 to about 75 weight percent comprises the described polymer and about 25 to about 85 weight percent is the zinc-containing pigment and other non-volatile solid matter other than the polymer such as fillers, other pigments, etc. The liquid portion of the mastics and caulks may be a polymer solvent, aqueous polymer dispersant, or other material. The cured compositions exhibit exceptionally good wet adhesion to architectural structural materials, especially to materials having relatively non-adherent surfaces such as foamed polyurethane roof insulation and smooth surfaced elastomers and plastics, even after heat aging.

40 Claims, No Drawings

MASTIC AND CAULKING COMPOSITIONS

This application is a continuation-in-part of U.S. patent application Ser. No. 903,779 filed Sept. 4, 1986 now U.S. Pat. No. 4,855,349.

BACKGROUND

1. Field of the Invention

This invention relates to the field of coating mastic and caulking compositions and to composite articles manufactured with such compositions In particular it relates to architectural coating mastic and caulking compositions and to roof coating mastics.

2. Introduction

Architectural mastic and caulking compositions are used in a wide variety of applications to seal and protect architectural material substrates and to seal and protect joints and other openings in architectural materials. They are used in both interior and exterior applications, and in both cases are exposed to conditions such as moisture, sunlight, temperature variations, etc. that require such compositions to have a balance of properties enabling them to perform their intended functions for extended periods of time. Typically, mastics and caulks must be fluid or semi-fluid compositions which are stable, high solids content formulations usually having a total solids content of about 60 weight percent or more. They should have permanent low temperature flexibility when cured, particularly in the case of mastic compositions intended for exterior application. Both the mastics and caulks should have sufficient wetting ability to readily wet, cover and adhere to even the most hydrophobic architectural substrates such as polyurethane, ethylene-propylene-diene interpolymer materials, and the like. Very low residual surface tack is generally required in cured mastics and caulks, and they should quickly become non-tacky shortly after application to prevent adherence of dust, dirt or other materials.

High tensile strength is also required, particularly for mastics intended to protect vulnerable exterior materials such as foamed polyurethane insulation. High tensile strength provides improved puncture and tear resistance in the cured coating or caulk and overall protection of the substrates or architectural joint at both high and low temperatures since tensile strength ensures against cracking or separation as a result of thermal expansion (as well as relative motion from other causes). While compositions intended for exterior use can be clear, they are often pigmented, particularly in the case of protective roof coatings with opaque reflective pigments such as titanium oxide and zinc oxide. They also preferably are good reflectors and heat radiators to minimize temperature extremes.

High adhesion to all varieties of architectural construction materials is also desirable and is especially important in some roofing applications which employ relatively hydrophobic roofing materials such as foamed polyurethane insulation and ethylene-propylene-diene interpolymer coatings. High adhesion to other structural materials such as wood, concrete, metals, glass and other materials is also desirable to enable flexibility of use. Exterior coatings also should be resistant to weather and, in particular, should have good "wet adhesion" and resistance to oxidation, ultraviolet radiation and air pollutants found in industrial and urban areas.

Water impermeability and resistance (low absorption) are essentially universal requirements of both exterior and interior mastics and caulks and are particularly important for use in areas exposed to water such as kitchens and bathrooms. Physical stability of the cured composition is also a relatively high priority in essentially all applications, particularly for exterior mastics and caulks which must be resistant to creep at high temperatures and excessive shrinking at cold temperatures, the latter of which can promote cracking and separation from substrates.

In addition to all the foregoing requirements, it is also desirable that caulks and mastics be relatively easy to manufacture in the absence of expensive and/or toxic materials. For instance, water-base mastics and caulks are much preferred over solvent compositions due to the added expense, pollution, toxicity, and fire hazards associated with the use of solvents. Furthermore, previous investigators have found that many of the above-noted desirable physical and chemical properties can be achieved by the use of compositions which contain potentially toxic monomers, catalysts or cross-linking agents which improve the strength of the mastic or caulk binder (usually a synthetic polymer). Thus, N-methylolamide-functional monomers and other cross-linking monomers and agents are known to improve polymer performance in mastics and caulks in several respects. However, many of the useful crosslinking monomers and agents release toxic materials upon curing and can result in the presence of toxic residues in the finished article. For instance, N-methylolamide-containing polymers release formaldehyde when cured, and they can result in formaldehyde residues in the finished mastic or caulk. Formaldehyde release and residues are often undesirable since formaldehyde is coming under ever increasing scrutiny in both the work place and home, and the State and Federal Occupational Health and Safety Administrations (OSHA) have set stringent formaldehyde exposure limits for industrial workers.

The polymer binders, particularly those employed in water-base mastics and caulks, should have rheological properties sufficient to provide adequate stability to the heavily solids-loaded compositions and suitable cohesive and wetting properties to enable ease of application. Polymer latex viscosity and wetting ability are both influenced significantly by binder polymer composition and can limit latex utility by restricting filler loading level, substrate wetting ability, and the ease of mastic or caulk application.

Thus, the physical and chemical properties required in mastic and caulking compositions, in articles coated or sealed with such compositions, and in the polymer solutions or dispersions used in the manufacture of mastics and caulks, place various, sometimes conflicting, demands on polymer binder compositions and on the polymer carrier (i.e., solvent or water). Hence, it is desirable to obtain a polymer system, preferably a water-base polymer emulsion, which possesses a balance of properties suitable for the manufacture of architectural mastics and caulking compositions and of articles coated or sealed with such compositions. It is further desirable to obtain such a polymer system comprising a zinc-containing pigment, such as zinc oxide, and having good wet adhesion to a variety of substrates, including relatively non-adherent substrates, even after aging.

SUMMARY DESCRIPTION OF THE INVENTION

It has now been found that coating mastics and caulking compositions having an improved balance of properties can be obtained by employing as the binder a water-insoluble polymer having a $T_g$ of about $-50°$ C. to about $-10°$ C. which contains at least one pendant functional group (i.e., one or more pendant functional groups) of the formula $$-R_1-\overset{\overset{O}{\|}}{C}-CH_2-X \qquad (1)$$

where $R_1$ is a divalent organic radical at least 3 atoms in length, and X is organoacryl or cyano. As used herein, the term "organic radical" means any radical containing at least one carbon atom.

Preferably, the polymer is permanently flexible and non-tacky when cured, i.e., when set.

Functional groups within formula (1) containing different $R_1$ and X radicals can be contained in the same polymer molecule, and polymers containing different $R_1$ and X groups can be blended in the same mastic or caulk composition. Typically, the mastic and caulking compositions comprise 60 to 90 weight percent total undissolved solids, 15 to 75 weight percent of which is one or more of the described water insoluble polymers, and 25 to 85 weight percent of which comprises undissolved solids other than the polymer.

The novel compositions are stable, fluid or semi-fluid, high solids content mastics and caulks which have permanent low temperature flexibility and very low residual tack when cured, yet they have good wetting ability for a variety of architectural substrates, high tensile strength and high impact, puncture and tear resistance and exceptionally high adhesion even to relatively non-adherent substrates such as foamed polyurethane roofing insulation and ethylene-propylene-diene interpolymer structural materials. These mastics and caulks are also water impermeable and possess superior wet adhesion to a variety of substrates, are shrink resistant and have sufficiently high chemical and physical stability to temperature variations, ultra-violet light, and oxidation to make them particularly useful as protective coatings and caulks in high exposure uses such as roofing and siding protectants and fillers. Both the mastics and caulks are compatible with opaque reflective pigments, and the pigmented compositions have superior reflective and heat radiation characteristics which make them particularly suitable for roofing mastics and caulks, especially for the production of foamed polyurethane roofing insulation.

Composite architectural structural materials are also provided which comprise relatively inflexible, architectural substrates coated on at least a portion of one surface with the described mastic compositions. Particularly useful composite articles comprise polyurethane roofing material, such as roofing insulation, coated on its upper surface with the described coating mastic containing an opaque reflective pigment.

It has also now been found that the wet adhesion, even to relatively non-adherent substrates (such as foam polyurethane and ethylene-propylene-diene interpolymer structural materials), of those mastic and caulking compositions of this invention which comprise a zinc-containing pigment (e.g., zinc oxide) can be further improved by employing a polyphosphate anion as an additional component of the composition. Such component is hereinafter referred to as a polyphosphate component. Advantageously, improved wet adhesion can be thus achieved for both aged and unaged compositions.

DETAILED DESCRIPTION OF THE INVENTION AND OF THE MANNER AND PROCESS OF MAKING AND USING IT

Improved coating mastic and caulking compositions having total undissolved solids contents of about 60 to about 90 weight percent of which about 15 to about 75 weight percent comprises a water-insoluble polymer and about 25 to about 85 weight percent comprises undissolved solids other than the polymer are obtained by employing, as the binder, a polymer having a $T_g$ (glass transition temperature) of about $-50°$ C. to about $-10°$ C. and containing at least one pendant functional group (i.e., one or more pendant functional groups) of the formula:

$$-R_1-\overset{\overset{O}{\|}}{C}-CH_2-X \qquad (1)$$

where $R_1$ is a divalent organic radical at least 3 atoms in length, and X is organoacyl or cyano. Relatively good flexibility is obtained throughout a wide temperature range by employing, as the polymer binder, a polymer having a $T_g$ within the described range. Rapid loss of tack upon curing and low residual tack can be obtained by employing polymers of sufficiently high molecular weight to reduce or eliminate tackiness that would otherwise occur, particularly with the lower $T_g$ polymers. The interrelationship of polymer composition, $T_g$, and molecular weight on residual tack are discussed in greater detail hereinafter.

Any polymer containing at least one pendant functional group of formula (1), supra, can be employed as the polymer in this invention. The remainder of the polymer, i.e., the polymer portion other than the one or more pendant functional groups of formula (1), may be selected, for example, from (A) conjugated diolefin polymers comprising at least about 50 weight percent of one or more conjugated diene monomers having 4 to about 8 carbon atoms and 0 to about 50 weight percent of one or more alkenyl-substituted monoaromatic monomers, (B) olefin-ester interpolymers comprising at least about 1 weight percent of a monoolefin monomer having up to about 4 carbon atoms and at least about 40 weight percent of an alkenyl or alkenol ester of a saturated carboxylic acid, (C) olefinically unsaturated carboxylic acid ester polymers comprising at least about 40 weight percent polymerized olefinically unsaturated carboxylic acid ester monomers, (D) alkenyl ether polymers containing at least about 30 weight percent alkenyl ether monomer units, and (E) combinations thereof. The polymers of group (C) are preferred, i.e., the remainder of the polymer containing at least one pendant functional group of formula (1) preferably comprises at least about 40 weight percent of at least one polymerized olefinically unsaturated carboxylic acid ester monomer, the polymer preferably being permanently flexible and non-tacky when cured, i.e., when set.

Functional groups within formula (1), supra, containing different $R_1$ and X radicals can be contained in the same polymer molecule, and polymers containing different $R_1$ and X radicals can be used in combination, e.g., in the same solution or dispersion.

The useful polymers contain functional groups containing either two carbonyl groups or a carbonyl and a cyano group separated by a single methylene group, as illustrated, and the methylene group is separated from the polymer main chain (backbone) by at least 4 atoms ($R_1$ plus the "interior" carbonyl group). Thus, $R_1$ is a least 3 atoms in length; i.e., the shortest link between the interior carbonyl group and the polymer backbone is at least 3 atoms long. Otherwise, the structure of $R_1$, including its molecular weight and elemental composition, does not negate the effectiveness of the dual keto or keto-cyano functionality of the pendant side chains. Thus, $R_1$ can be a divalent organic radical of any molecular weight sufficient to allow incorporation of the pendant functional groups into the polymer, i.e. attachment of the pendant functional groups to the polymer backbone, for instance (a) as part of a polymerizable olefinically unsaturated monomer by way of copolymerization thereof or (b) by substitution onto a preferred polymer, i.e. by substitution onto a preferred polymer backbone ("Backbone") by any suitable reaction, e.g.:

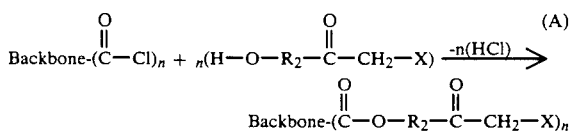
(A)

or

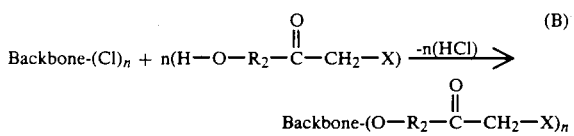
(B)

In reactions (A) and (B), supra, N is an integer, and $O-R_2$ is $R_1$ in formula (1), supra, $R_2$ being a divalent organic radical, usually of not more than 100 atoms in length, and preferably containing no more than 39 carbon atoms (more preferably, no more than 19 carbon atoms). $R_1$ can contain heteroatoms, such as oxygen, sulfur, phosphorus, and nitrogen; functional groups such as carbonyl, carboxy-ester, thio, and amino substituents; and can comprise atomatic, olefinic or alkynyl unsaturation. Typically, $R_1$ will be a cyclic or acyclic divalent organic radical of 3 to about 40 atoms in length, i.e., having 3 to about 40 atoms in its shortest chain between the polymer backbone and the interior carbonyl group. For ease of manufacture from readily available reactants, $R_1$ is preferably of the formula:

(2)

wherein Y and Z are independently selected from O, S, and $NR_7$, and $R_3$ is a divalent organic radical at least 1 atom in length, preferably 2 to about 40, and most preferably 2 to about 20 atoms in length. Y and Z are preferably O, and $R_7$ is H or a monovalent organic radical, preferably H or a hydrocarbyl radical having up to 6 carbon atoms, with $R_7$ most preferably being H.

Most preferably, $R_3$ is selected from substituted and unsubstituted alkylene, polyoxyalkylene, polythioalkylene and polyaminoalkylene radicals, typically up to about 40 atoms in length, preferably up to about 20 atoms in length. The substituted and unsubstituted polythio-, polyoxy-, and polyaminoalkylenes can be readily formed by the well known condensation of alkylene oxides, alkylene amines, glycols, diamines, and dithiols. Thus, for example:

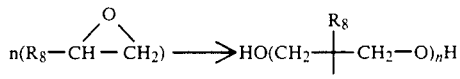

where $R_8$ is H or a monovalent organic radical, preferably H or an alkyl radical, and, as will be readily apparent to those skilled in the art, the illustrated general formula for the product represents $HO(CH]R_8]$—$CH_2$—$O)_nH$, $HO(CH_2$—$CH[R_8]$—$O)_nH$ and mixtures thereof. Such $R_8$ radicals typically contain no more than about 38 carbon atoms, and more typically, no more than 18 carbon atoms.

X in expressions (1), (A) and (B) is —CO—$R_4$ or —CN, preferably —CO—$R_4$ where $R_4$ is hydrogen or a monovalent organic radical preferably having up to 10 atoms other than hydrogen (i.e., up to 10 atoms not counting hydrogen atoms which may be present in the radical), $R_4$ most preferably being methyl.

To illustrate, the pendant functional groups of formula (1) can be introduced into the polymer backbone, i.e. included in the polymer, by copolymerization of other monomers (discussed hereinafter) with a polymerizable functional monomer of the formula:

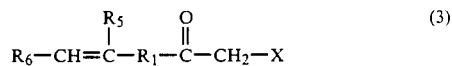
(3)

wherein X and $R_1$ are as defined for formula 1, supra, $R_5$ and $R_6$ are independently selected from hydrogen, hydroxy, halo, thio, amino, and monovalent organic radicals, preferably having up to 10 atoms other than hydrogen, most preferably alkyl radicals having up to 10 carbons atoms. Substituting the preferred form of the group $R_1$ illustrated in formula 2 for $R_1$ in formula 1 yields the most preferred functional monomers:

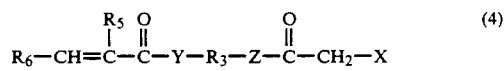
(4)

where $R_3$, $R_5$, $R_6$, X, Y and Z have the definitions given above. From this expression it can be seen that when (a) $R_6$ is hydrogen, (B) X is —CO—$R_4$, (C) $R_4$ and $R_5$ are methyl, (d) Y and Z are O, and (E) $R_3$ is an ethylene radical, the resulting monomer is acetoacetoxyethyl methacrylate, one of the class of monomers described by Smith in U.S. Pat. No. 3,554,987, the disclosure of which is incorporated herein by reference in its entirety. This monomer can be prepared by first treating ethylene glycol with methacrylic acid to form hydroxyethyl methacrylate, which then is treated with diketene, as described by Smith, to form acetoacetoxyethyl methacrylate. A particularly preferred class of functional monomers, due to their relative availability, are those disclosed by Smith, which correspond to formula (4) in which $R_6$ is hydrogen, Y and Z are oxygen, $R_5$ is hydrogen or an alkyl group having up to 12 carbon atoms, $R_3$ is an alkylene group containing up to 10 carbon atoms, X is —CO—$R_4$, and $R_4$ is an alkyl group having up to 8 carbon atoms.

The binder polymers contain a sufficient amount of one or more of the described functional monomers to increase the physical strength, particularly the adhesive and tensile strength, of the mastic or caulk relative to an otherwise identical composition in the absence of such functional monomers. Detectable strength enhancement is found in many polymers at functional monomer concentrations as low as 0.05 weight percent. Generally, however, the polymers will contain at least about 0.1 and typically at least about 0.25 weight percent of the functional monomer based on total polymer weight. Much higher functional monomer concentrations can be employed. Thus, functional monomer concentrations will usually be between about 0.1 to about 40 weight percent or more, typically about 0.1 to about 10 weight percent. Surprisingly, significant increases in adhesive strength can be achieved at functional monomer concentrations below 5 weight percent and even below 2 weight percent. Hence, preferred functional monomer concentrations in many of the useful compositions are within the range of about 0.1 to about 5 weight percent, often within the range of about 0.1 to about 2 weight percent.

Presently preferred polymers which contain the above described functional monomers include (1) copolymers of substituted or unsubstituted alkenyl aromatic monomers and conjugated iolefins, (2) olefin-ester interpolymers of $C_{2-4}$ monoolefins and $C_{2-8}$ alkenyl or alkenol esters of $C_{1-12}$ saturated carboxylic acids, (3) polymerized alkyl and alkanol esters of olefinically unsaturated carboxylic acids, (4) alkenyl ether homopolymers and interpolymers of $C_{2-10}$ olefin ethers of $C_{1-10}$ alcohols, and (5) combinations thereof. In addition to the above described functional monomers, each of these preferred classes of polymers can contain additional monomers such as olefinically unsaturated mono- and polycarboxylic acids, amides, aldehydes, etc.

Illustrative polymers of esters of oelfinically unsaturated carboxylic acids are described by Spada and Wilczynski in copending application Ser. No. 859,057 filed May 2, 1986 for PRESSURE SENSITIVE ADHESIVES AND MANUFACTURED ARTICLES and by Midgley in U.S. Pat. No. 4,540,739 (1985), the disclosures of which are incorporated herein by reference in their entireties. These polymers comprise, primarily, one or more polymerized, olefinically unsaturated mono- and/or polycarboxylic acid esters and optionally may contain other polymerized monomers. Thus, the ester polymers usually contain at least about 40 weight percent, often at least about 60 weight percent, and preferably at least about 80 weight percent polymerized olefinically unsaturated carboxylic acid ester monomers other than the above described functional monomers. Presently preferred ester monomers are esters of olefinically unsaturated mono- and polycarboxylic acids having 4–17 carbon atoms, and hydroxy-, amino-, or thio-substituted or unsubstituted alcohols, amines, and thiols having from 1 to about 30 carbon atoms, preferably 1 to about 20 carbon atoms, per molecule. Illustrative unsaturated carboxylic acids are acrylic, methacrylic, fumaric, maleic and itaconic acids, etc. Illustrative hydroxy, amino, and thio-substituted alcohols, amines, and thiols are glycerol, 1-hydroxy-5-thiododecane, and 2-amino-5-hydroxyhexane, etc. Presently preferred esters, due primarily to cost and availability, re hydroxy-substituted and unsubstituted alcohol esters of acrylic and methacrylic acids such as butyl acrylate ("BA"), 2-ethylhexyl acrylate ("EHA"), methyl methacrylate ("MMA"), and hydroxyethyl acrylate ("HOEA"), etc.

A variety of olefinically unsaturated carboxylic acid ester monomers, as well as a variety of other polymerizable olefinically unsaturated monomers useful for the manufacture of polymers having the desired relatively low $T_g$s, and the interrelationship of these monomers to polymer $T_g$ are discussed in the Handbook of Pressure Sensitive Adhesive Technology, Van Nostrand-Reinhold Company, New York, 1982, particularly at pages 298 through 329, including the references cited therein, the disclosures of which are incorporated herein by reference in their entireties.

The desired glass transition temperature can be achieved with carboxylic acid ester homopolymers but is usually obtained by polymerizing one or more "hard" ester monomers with suitable proportions of one or more "soft" ester monomers to form a polymer (i.e., an interpolymer) having the $T_g$ best suited to the particular application. So called "hard" monomers are those which produce homopolymers having relatively high $T_g$s while "soft" monomers are those which form homopolymers having relatively low $T_g$s. For instance, acrylate monomers are typically "softer" than the corresponding methacrylic acid esters. Thus, poly(ethyl acrylate) has a $T_g$ of $-22°$ C. while poly(ethyl methacrylate) has a $T_g$ of 65° C. The $T_g$ of poly-n-butyl acrylate is $-54°$ C. as compared to a $T_g$ of 20° C. for poly(n-butyl methacrylate). Commonly employed "soft" monomers are n-butyl acrylate, 2-ethylhexyl acrylate and n-octyl acrylate, while various methacrylates, including methyl, isopropyl, n-butyl, and t-butyl methacrylate, are typical "hard" monomers.

The $T_g$ of any homopolymer can be readily determined, and the $T_g$ of an interpolymer of two or more such monomers can be predicted, approximately, from the respective $T_g$s of each of the monomers involved. The most exact method of determining the glass transition temperature of a selected interpolymer of any combination of monomers is, of course, measurement of the $T_g$ of that interpolymer per se. The homo- and interpolymers useful in the compositions of this invention typically have $T_g$s of about $-50°$ C. to about $-10°$ C., preferably about $-50°$ C. to about $-20°$ C.

The described functional monomers and olefinically unsaturated carboxylic acid ester monomers can constitute, when polymerized, the total polymer composition of this polymer class, or a portion of the polymer molecule not accounted for by those two monomer classes can be, when polymerized, any polymerizable, olefinically unsaturated monomer or combination of such monomers. Illustrative of other polymerizable monomers are vinyl esters of carboxylic acids, the acid moiety of which contains from 1 to about 20 carbon atoms (e.g. vinyl acetate, vinyl propionate, vinyl isononanoate); aromatic or aliphatic, alpha-beta-unsaturated hydrocarbons such as ethylene, propylene, styrene, and vinyl toluene; vinyl halides such as vinyl chloride and vinylidene chloride; olefinically unsaturated nitriles such as acrylonitrile; and olefinically unsaturated carboxylic acids having 3 to 10 carbon atoms such as acrylic, methacrylic, crotonic, itaconic, and fumaric acids, and the like.

The conjugated diolefin polymers typically contain about 0.5 to about 50 weight percent of one or more alkenyl (e.g., vinyl) aromatic monomers and about 50 to about 99 weight percent of one or more conjugated diolefins having 4 to about 8 carbon atoms. These copolymers may be either random or block interpolymers. Illustrative alkenyl aromatic monomers include styrene, alpha-methylstyrene, p-methylstyrene, chlorostyrene, methyl-bromostyrene, etc. Illustrative conjugated diolefin monomers include butadiene, isoprene, etc. The alkenyl aromatic monomer is preferably present at a concentration of about 5 to about 70 weight percent, most preferably about 20 to about 50 weight percent, while the conjugated diolefin monomer is typically present at a concentration of about 30 to about 95 weight percent, most preferably about 50 to about 80 weight percent. A preferred diolefin polymer is a random interpolymer of about 20 to about 40 weight percent styrene and about 80 to about 60 weight percent butadiene.

As in the case of the olefinically unsaturated carboxylic acid ester polymers discussed above, the conjugated diolefin polymers can contain various other monomers in addition to the above described functional monomers, such as the vinyl esters of saturated carboxylic acids, monoolefins, olefinically unsaturated nitriles, olefinically unsaturated carboxylic acids, etc., discussed above with regard to the olefinically unsaturated carboxylic acid ester interpolymers. Furthermore, the conjugated diolefin polymers can contain up to about 40 weight percent, typically up to about 20 weight percent, of olefinically unsaturated carboxylic acid ester monomer units such as those described above for use in production of the useful carboxylic acid ester interpolymers.

The olefin-ester interpolymers typically contain from about 1 to about 40 weight percent of a $C_{2-4}$ monoolefin monomer, from about 60 to about 98.5 weight percent of a $C_{2-8}$ alkenyl or alkenol ester of a $C_{1-12}$ saturated carboxylic acid and from about 0.5 to about 10 weight percent of a functional monomer as described above. Preferably, the monoolefin monomer is present in an amount from about 1 to 25 weight percent, most preferably from about 10 to 15 weight percent. Illustrative monoolefins are ethylene, propylene and butylene, with ethylene being preferred. The ester component of the olefin-ester interpolymers is preferably a $C_{2-8}$ alkenyl or alkenol ester of a $C_{1-12}$ saturated carboxylic acid. The ester component is more preferably a vinyl ester of a $C_{1-12}$ saturated carboxylic acid, such ester being obtainable by vinylation of the desired acid, i.e., by reaction of acetylene with such acid. Most preferably, the ester component is vinyl acetate, which is available commercially and obtainable, for example, by vapor phase reaction of acetylene, acetic acid and oxygen using zinc acetate catalyst. Illustrative $C_{3-8}$ unsaturated alcohols and diols which can be reacted with $C_{1-12}$ saturated carboxylic acids to form reactive (i.e., addition polymerizable) esters are $C_{3-8}$ alkenols such as propenol, butenol, pentenol, hexenol, heptenol and octenol and their diol homologues. Suitable saturated acids include, for example, formic, acetic, propionic, butanoic, valeric, caproic, heptanoic, octanoic, decanoic and dodecanoic acids. The most common of the foregoing esters are vinyl acetate, vinyl propionate, and vinyl butanoate. A preferred olefin-ester polymer is an interpolymer of ethylene and vinyl acetate containing from about 1 to about 40 (preferably from about 1 to about 25, and more preferably about 10 to about 15) parts by weight of ethylene units and from about 99 to about 60 (preferably from about 99 to about 75, and more preferably from about 90 to about 85) parts by weight of vinyl acetate units.

The alkenyl ether polymers typically contain at least about 30 weight percent, preferably at least about 50 weight percent, polymerized alkenyl ether monomer units in which the alkenyl group has at least 2 carbon atoms, typically 2 to about 10 carbon atoms, and the alcohol (hydrocarbyl-oxy) group has from 1 to about 10 carbon atoms. Illustrative are methylvinyl ether, n-octyl-1- propenyl ether, 2,4-dimethylbutyl-2-hexenyl ether, vinylphenyl ether, etc.

The polymers encompassed by the four general classes described above can contain minor amounts, e.g. up to 30 weight percent, of one or more additional monomers, and they can be grafted or reacted with other chemical agents to modify their chemical composition. Thus, the conjugated diolefin polymers and the olefinically unsaturated acid ester polymers of groups (A) and (C), respectively, may contain minor amounts of substituted and unsubstituted monoolefin monomers such as ethylene, isobutylene, chlorobutenes, acrylonitrile, vinyl ethers, alkenyl esters of saturated carboxylic acids, etc. The conjugated diolefin polymers (group A) may also contain olefinically unsaturated carboxylic acid ester monomers, and the olefinically unsaturated acid ester polymers (group C) may contain conjugated diolefin monomers (e.g., butadiene) and/or alkenyl monoaromatic monomers (e.g., styrene). Similarly the alkenyl ester polymers of group (B) and the alkenyl ether polymers of group (D) can contain substituted and/or unsubstituted conjugated diolefins, alkenyl aromatics, olefinically unsaturated carboxylic acid esters, etc.

It has been found that minor amounts of olefinically unsaturated mono- and polybasic carboxylic acids and/or sulfoalkyl esters of such carboxylic acids significantly improve cohesive and adhesive strength of the mastics and caulks. Thus, it is presently preferred that the polymers contain at least about 0.1 weight percent, usually about 0.1 to about 10 weight percent, and preferably about 0.1 to about 5 weight percent of a polymerized olefinically unsaturated carboxylic acid having 3 to about 10 carbon atoms and/or a sulfoalkyl ester of such acid, e.g. sulfoethyl methacrylate, sulfoethyl itaconate, sulfomethyl maleate, sulfomethyl malonate, etc.

Although the polymers can contain other "functional" monomers such as N-methylol amides, e.g., N-methylol acrylamide, it has been found that such other functional monomers are not essential to achieving acceptable physical properties and that the detriment associated with the presence of such monomers, such as formaldehyde release upon curing, loss of adhesive strength, etc., can be avoided by minimizing the concentration of such N-methylol amides or eliminating them altogether. Thus, the preferred polymers contain less than about 1 percent, preferably less than about 0.5 percent, and most preferably no amount of N-methylol amide monomer units.

It also has been found that suitable physical properties can be achieved without crosslinking or hardening agents such as aldehyde hardeners (e.g., formaldehyde, mucochloric acid, etc.), cross-linking catalysts such as the strong base catalyst discussed by Bartman in U.S. Pat. No. 4,408,018, acid catalysts such as phosphoric or methane sulfonic acid, complexing agents such as metals and metal compounds and complexes, or reactive monomers (e.g., glycols, polyamides, etc.). Such hardening agents increase the complexity and expense of polymer manufacture. Since they are not required to obtain the desired physical properties with the polymers of this invention, and, in many instances, the incorporation of such "hardening" agents impairs other desirable properties such as adhesive strength, the preferred polymers are substantially free of such hardening agents or their residues. Nevertheless, minor amounts of such materials can be present.

Polymer molecular weight can have a significant effect on the balance of physical properties in polymers of a given monomer composition, i.e. polymers of identical monomer content. Thus, as discussed in the Handbook of Pressure Sensitive Adhesive Technology, for instance at pages 307–311, shear resistance is roughly proportional to molecular weight up to relatively high molecular weights at which shear resistance drops off dramatically in some polymers. Residual tack is typically high at very low molecular weights and decreases gradually as molecular weight is increased after a molecular weight value yielding maximum tack is exceeded. Adhesive strength (peel) typically exhibits discontinuous behavior, increasing with molecular weight up to moderate molecular weight levels and then gradually decreasing as molecular weight is increased further.

As opposed to polymers preferred for the manufacture of pressure sensitive adhesives which have high residual tack, the polymers useful in this invention have very low residual tack and lose tack rapidly as they cure. Thus, the molecular weight of the polymers useful in this invention is sufficiently high to provide rapid loss of tack upon curing and very low residual tack in the described mastic and caulking compositions. Slow loss of tack upon curing and significant residual tack are undesirable in most if not all mastic and caulking applications since tackness promotes adhesion of dust and other materials and renders the mastic or caulk more difficult to apply and work around after application. The accumulation of dust and other materials which might darken the surface of the mastic or caulk is particularly undesirable in the case of reflective coatings such as exterior coatings, particularly in the case of reflective roof coatings which preferably reflect and radiate sufficient heat to reduce maximum roof temperature on sunny days.

Rapid tack loss upon curing and the preferred low residual tack values can usually be achieved by employing polymers having number average molecular weights of at least about 50,000, typically at least about 75,000, and preferably at least about 100,000 as determined by gel permation chromatography. Higher molecular weight polymers can be employed and, in most cases, there is no essential upper limit on polymer molecular weight. The few exceptions, as described in the Handbook of Pressure Sensitive Adhesive Technology, are those polymers in which shear resistance (cohesive strength) can drop off dramatically at very high molecular weights. Polymer cohesive strength is largely responsible for tensile strength of the mastic and caulking compositions of this invention and is preferably sufficiently high to maintain the desired physical integrity of the mastic or caulk. Thus, polymer molecular weight preferably does not exceed the level at which significant reduction in shear value is observed in those susceptible polymers, particularly when the mastic or caulk is intended for applications requiring any significant degree of tensile strength.

As a rule, polymer shear strength—the ability of the polymer to prevent cohesive failure—is not the limiting physical strength factor in mastics and caulks due to the high molecular weight of the polymers employed, and thus their high intrinsic shear strength. Thus, it is not usually necessary to control polymer properties to insure adequate cohesive strength of the compounded mastic or caulk except in compositions having very low polymer concentrations, e.g. below about 15 weight percent of total solids. Nevertheless, a great advantage of the compositions of this invention is that the useful polymers containing the described functional monomers have shear values significantly higher than the shear values of polymers of otherwise identical monomer composition and molecular weight in the absence of the described functional monomers. As a result, higher non-polymer solids loadings can be employed in the mastics and caulks of this invention without cohesive failure than is the case with otherwise identical mastics and caulks containing polymers of identical monomer compositions and molecular weight in the absence of the described functional monomers. Thus, mastics and caulks containing the described polymers possess a superior balance of physical properties, particularly an improved balance of shear strength and adhesion (adhesivesness to substrates), which provides superior performance characteristics and enables higher loadings of non-polymeric solids than is possible with polymers not containing the described functional monomers.

While all of the polymers described above can be employed for the manufacture of mastics and caulks, polymers which contain little or no diene monomer or other oxidation and UV susceptible monomer units are presently preferred, particularly for exterior applications, and, more particularly, for roof-coating mastics. Thus, the above described olefin-ester polymers, olefinically unsaturated carboxylic acids ester polymers and alkenyl ether polymers which are free of significant residual olefinic unsaturation in the polymer backbone are presently preferred external mastics and caulks. The olefinically unsaturated carboxylic acid ester polymers are presently most preferred for such applications.

The useful polymers can be prepared by free radical solution and emulsion polymerization methods known in the art including batch, continuous and semicontinuous procedures. For the purposes of this disclosure, free radical polymerization methods are intended to include radiation polymerization techniques. Illustrative free-radical polymerization procedures suitable for preparing aqueous polymer emulsions involve gradually adding the monomer or monomers to be polymerized simultaneously to an aqueous reaction medium at rates proportionate to the respective percentage of each monomer in the finished polymer and initiating and continuing polymerization with a suitable free radical polymerization catalyst. Optionally, co-polymers can be obtained by adding one or more comonomers disproportionately throughout the polymerization so that the portion of the polymers formed during the initial polymerization stage comprise a monomer composition differing from that formed during intermediate or later stages of the same polymerization. For instance, a styrene-butadiene copolymer can be formed by adding a greater proportion or all of the styrene during the initial polymerization stages with the greater proportion of the butadiene being added later in the polymerization.

Illustrative free-radical catalysts are free radical initiators such as hydrogen peroxide, potassium or ammonium peroxydisulfate, dibenzoyl peroxide, lauroyl peroxide, ditertiarybutyl peroxide, 2,2-azobisisobutyronitrile, etc., either alone or together with one or more reducing components such as sodium bisulfite, sodium metabisulfite, glucose, ascorbic acid, erythorbic acid, etc. Ultraviolet (UV) and electron beam polymerization methods suitable for initiating free radical polymerization are discussed in the Handbook of Pressure Sensitive Adhesive Technology, particularly at pages 586–604 and the reference cited therein. The reaction is continued with agitation at a temperature sufficient to maintain an adequate reaction rate until most or all monomers are consumed. Monomer addition is usually continued until the latex reaches a polymer concentration of about 20 to about 70 weight percent.

Significant loss of adhesive strength, elongation and flexibility can result from the use of excess catalyst, particularly in the later or final stages of polymerization. This apparently is due to the presence of the described functional monomer, since such losses generally do not result in the absence of such monomers. Thus, the total catalyst concentration is generally below about 5, preferably below about 2, and most preferably below about 1 weight parts per weight of functional monomer.

Physical stability of the dispersion usually is achieved by providing in the aqueous reaction medium one or more nonionic, anionic, and/or amphoteric surfactants including copolymerizable surfactants such as sulfonated alkylphenol polyalkyleneoxy maleate and copolymerizable stabilizers such as sulfoethyl methacrylate, alkenyl sulfonates, etc. Illustrative of nonionic surfactants are alkylpolyglycol ethers such as ethoxylation products of lauryl, oleyl, and stearyl alcohols or mixtures of such alcohols such as coconut fatty alcohols; alkylphenol polyglycol ethers such as ethoxylation products of octyl- or nonylphenol, diisopropylphenol, triisopropylphenol, di- or tritertiarybutyl phenol, etc. Illustrative of anionic surfactants are alkali metal or ammonium salts of alkyl, aryl, or alkaryl sulfonates, sulfates, phosphates, phosphonates, etc. Examples include sodium lauryl sulfate, sodium octylphenol glycolether sulfate, sodium dodecylbenzene sulfonate, sodium lauryl diglycol sulfate, and ammonium tritertiarybutylphenol penta- and octa-glycol sulfates. Numerous other examples of suitable ionic, nonionic and amphoteric surfactants are disclosed in U.S. Pat. Nos. 2,600,831, 2,271,622, 2,271,623, 2,275,727, 2,787,604, 2,218,920, and 2,739,891, the disclosures of which are incorporated herein by reference in their entireties.

Protective colloids may be added to the aqueous polymer dispersions either during or after the reaction period. Illustrative protective colloids include gum arabic, starch, alginates, and modified natural substances such as methyl-, ethyl-, hydroxyalkyl- and carboxymethylcellulose, and synthetic substances such as polyvinyl alcohol, polyvinyl pyrrolidone, and mixtures of two or more of such substances. Fillers and/or extenders such as dispersible clays, and colorants, such as pigments and dyes, can also be added to the aqueous dispersions either during or after polymerization. Those skilled in the art of emulsion polymers will appreciate that protective colloids, tackifiers, and other additives should be compatible with the polymer emulsion to assure formation of a stable dispersion.

The emulsions typically contain about 20 to about 70 percent polymer as manufactured, while preferred latexes typically have polymer solids contents of about 40 to about 60 weight percent. The dispersed polymer particles can be of any size suitable for the intended use, although particle sizes of at least about 100 nanometers are presently preferred. Most often, the described latexes will have particle sizes within the range of about 100 to about 1000 nanometers as determined on the model N-4 or the "Nanosizer" available from Coulter Electronics, Inc., of Hialeah, Florida.

Solutions of the useful polymers can be prepared by polymerizing the selected monomers as described above in solvents in which both the monomers and the polymers are soluble. Suitable solvents include aromatic solvents such as xylene and toluene, alkanes such as hexane, and alcohols such as butanol. Polymerization initiators and reducing components, when employed, should be soluble in the selected solvent or mixture of solvents. Illustrative free radical initiators soluble in the noted organic solvents include dibenzoyl peroxide, lauroyl peroxide, and 2,2-azobisisobutyronitrile. Erythorbic and ascorbic acids are illustrative of reducing components soluble in polar organic solvents. The water-based emulsions are presently preferred due to the expense and environmental and toxicity problems associated with solvents.

The coating mastic and caulking compositions generally contain about 60 to about 90 weight percent total solids of which about 15 to about 75 weight percent is one or more of the above described polymers and 25 to 85 weight percent is undissolved solids other than the polymer. The caulking compounds usually have total solids contents toward (i.e., in) the upper end of the described range, while the coating mastics generally have somewhat lower solids concentrations. The remainder of the composition can be either water or polar solvent other than water, or a combination of both. Typical polar solvents are those described above as being useful in the manufacture of polymer solutions. Thus, the compounded compositions will generally contain at least about 10, typically about 10 to about 40 and preferably 10 to about 30 weight percent liquid, the remainder being polymer and other solids. Polymer concentration usually corresponds to about 15 to about 75, generally about 40 to about 70 and most often about 50 to about 70 weight percent of total solids content. While mastics having total solids concentrations as low as 60 weight percent and sometimes even lower find utility in architectural applications, higher total solids loadings are generally preferred, and the compositions of this invention can be readily manufactured to obtain stable fluid or paste-like mastics and caulks having total solids contents of about 70 to about 90 weight percent and otherwise acceptable physical properties. The remaining solids concentration other than that accounted for by the above described polymers is largely or totally accounted for by pigments and/or fillers employed to color the compositions, render them reflective (as in the case of roof coatings), or to extend the volume and weight of the mastic or caulk relative to polymer content and thereby reduce overall expense. Such nonpolymeric solids usually account for about 25 to about 85 weight percent, typically about 30 to about 60 weight percent, and most often about 40 to about 50 weight percent of the total solids content.

Pigments are often employed as colorants, although highly reflective opaque pigments such as titanium dioxide, zinc oxide, and the like are most often employed to produce mastics and caulks which are opaque, especially to ultra-violet light, and which reflect incident radiation, thereby reducing exterior surface temperatures. When employed, these pigments are typically used at concentrations of about 5 to about 75 weight percent, generally about 10 to about 60 weight percent, and most often about 10 to about 50 weight percent of total solids. Fillers and extenders other than pigments sometimes used to strengthen and/or extend the volume or mass of the mastic or caulk include natural or synthetic fibers and fillers and are typically employed at concentrations of about 5 to about 80 weight percent, generally within the range of about 10 to about 70 weight percent of total solids. Illustrative fibrous materials include fiberglass and fibers of other natural and synthetic polymeric materials. Preferred polymeric fibers are those which are insensitive to light and which have relatively low $T_g$s and which therefore do not inhibit flexibility, particularly at low temperatures. Illustrative of such polymers are polyethylene, polypropylene, etc. When employed, such fibers are usually present at concentrations of up to about 20 weight percent, most often about 5 to about 15 weight percent of total solids. Other fillers and extenders typically include finely divided inorganic materials which are dispersible in and are compatible with the remainder of the mastic or caulking composition. Illustrative materials include clays, calcium carbonate, silica, mica, aluminum-magnesium silicates, magnesium silicates (e.g., talc), etc.

Other additives which may be employed include anionic dispersants, thickeners and other conventional coatings ingredients such as preservatives, anti-microbal agents, mildewicides, anti-freeze agents, coalescents, defoaming agents, dyes, placticizers, and adhesion promoters. Illustrative coating thickeners are cellulosic thickeners such as methylcellulose and hydroxyethyl cellulose, associative hydrophobic alkli-soluble emulsions, etc. The anionic dispersants can be employed to facilitate dispersion of inorganic materials including the above described pigments and fillers. Illustrative of such dispersants are sodium tripolyphosphate, potassium tripolyphosphate, polyacrylate dispersants, sulfonated polymers including naphthalene-formaldehyde sulfonated poly-condensates, polymaleates, natural product-derived dispersants such as tannins, lignins, alginates, gluconates, glucosides, organic phosphonates including methylene phosphonates, etc.

The coating mastics and caulks can be prepared by mixing the polymer solution or dispersion with the selected solid ingredients, e.g., pigment, filler etc., and other additives in high speed dispersion equipment such as a Cowles Disperser. The above described dispersing aids facilitate rapid dispersion and stabilization of the resulting dispersion.

The described mastics and caulks are useful for coating and filling, and exhibit high adhesion to a wide variety of architectural construction materials such as wood, concrete, metal, glass, synthetic materials such as plastics and elastomers, plaster, stucco, brick, wallboard, etc. They are particularly useful for protecting exposed architectural materials such as roofing and siding, and especially roofing materials such as asphalt, impregnated felt, hot-applied asphalt and pitch, single-ply bitumen roll, polyurethane roof coatings, particularly foamed polyurethane roof insulation, and other synthetic roofing and exterior siding materials such as ethylene-propylene-diene interpolymers. The mastics and caulks are particularly useful for coating and sealing physically fragile architectural materials which are susceptible to weather and which have relatively low adhesion surfaces i.e., surfaces that are difficult to bond to, such as polyurethane, especially high density, closed pore, polyurethane foam insulation, and ethylene-propylene-diene interpolymer substrates. Illustrative foamed polyurethanes include the so-called "popcorn," "orange peel," and smooth finish foams well known in the art. The ethylene-propylene-diene interpolymer substrates are typically interpolymers of ethylene-propylene and one or more dienes such as butadiene, isoprene, dicyclopentadiene, etc. For instance, the cured mastic compositions formulated with polymers containing the described functional monomers exhibit adhesive strengths to high density, closed pore, foamed polyurethane roof insulation several times greater than otherwise identical mastic compositions formulated with otherwise identical polymers not containing the described functional monomers. In fact, the cured adhesive bond strength of the useful mastics to polyurethane foam roof insulation is so much higher than that of comparable mastics not containing the described functional monomers that cohesive failure of the useful mastic occurs before failure of the adhesive bond to the substrate. The opposite is true of comparable mastics not containing the described functional monomers. Useful mastics can be readily formulated by procedures described above which have cured adhesive bond strengths to foamed polyurethane roof insulation of at least about 1 pound per inch, typically at least about 2 pounds per inch, and even about 3 pounds per inch or more when evaluated by the adhesion test procedures described in the following illustrative examples. The cured mastics are also resistant to weathering and environmental exposure, and they are particularly resistant to adhesive bond failure under wet conditions. Thus, mastics can be readily formulated by the above described procedures which have cured adhesive bond strengths to polyurethane foam under wet-test conditions of at least about 0.5 pound per inch, often at least about 1 pound per inch, and even about 2 pounds per inch or more when evaluated by the wet adhesion test procedures described in the following examples. The described caulks also exhibit superior wet and dry adhesion to substrates, particularly to substrates which are difficult to bond such as polyurethane, synthetic plastics and elastomers, ceramics such as ceramic tile, wallboard, plaster, etc. They are more impermeable and resistant (non-absorbant) to water when compared to comparable caulks which do not contain the described functional monomers.

The mastics can be readily applied to the selected substrate by a variety of application techniques well known in the art. The method of application typically depends, to some extent, on the viscosity and rheology of the applied composition. The roof mastics typically have viscosities somewhat greater than those of exterior latex paints, and they are usually applied by high pressure spray apparatus such as airless spray equipment. However, a variety of other techniques can also be employed such as brushing, rolling, electostatic spray, etc. The useful caulks are typically applied by any one of a variety of well known caulking guns, trowls or other equipment.

In embodiments employing both a zinc-containing pigment component and a polyphosphate component (i.e., a polyphosphoric acid, a hydrated or non-hydrated salt thereof, a mixture of polyphosphoric acids or a mixture of such salts) as components of the coating mastic and caulking compositions of this invention, any zinc-containing pigment and any polyphosphoric acid or salt thereof can be effectively employed as the zinc-containing pigment component and the polyphosphate component, respectively.

Suitable zinc-containing pigments for use in this invention include, for example, zinc oxide, zinc sulfide, zinc yellow, basic zinc chromate, zinc molybdate, basic zinc molybdate, zinc ferrite and zinc dust. Zinc oxide is preferred. The zinc-containing pigment may be employed in any suitable amount and can constitute up to 100 percent, e.g., from about 0.1 to about 100 percent, of the undissolved solids other than the water-insoluble polymer and any undissolved polyphosphate component.

The polyphosphoric acid which can constitute the polyphosphate component has at least 2 (i.e., 2 or more) recurring divalent units of the formula:

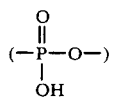

or, simply, $-(HPO_3)-$. Such acids include, for example, (a) linear polyphosphoric acids of the formula:

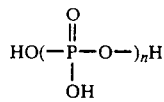

or, simply, $H_{n+2}P_nO_{3n+1}$ where n is an integer of at least 2, and (b) metaphosphoric acids (i.e., cyclic polyphosphoric acids) of the formula:

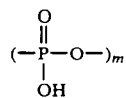

or, simply, $(HPO_3)_m$ where m is an integer of at least 3. Although n in formula (6) can correspond to polymeric linear structures having molecular weights of up to one million or more (e.g., n=12,500 or more), the value of n in linear polyphosphoric acids for use herein is usually not more than 20 and, more typically, not more than 10. In the cyclic metaphosphoric acids of formula (7) for use herein, m is usually not more than 18 and, more typically, not more than 12.

Suitable linear polyphosphoric acids for the practice of this invention include, for example, pyrophosphoric acid, tripolyphosphoric acid, tetraphosphoric acid, pentaphosphoric acid, hexaphosphoric acid, and mixtures thereof. Suitable cyclic polyphosphoric acids for the practice of this invention include, for example, trimetaphosphoric acid, tetrametaphosphoric acid, hexametaphosphoric acid, and mixtures thereof.

Suitable salts of the foregoing polyphosphoric acids include, for example, the mono-, di- and higher poly-alkali metal and ammonium salts thereof, such as the monosodium, disodium, trisodium, tetrasodium and pentasodium salts of pyrophosphoric acid and tripolyphosphoric acid, and the corresponding potassium salts, e.g., potassium tribasic pyrophosphate ($KH_3P_2O_7$).

Preferably, the polyphosphate component comprises at least one linear polyphosphoric acid or salt thereof and, more preferably, tripolyphosphoric acid or a salt thereof. Still more preferably, the polyphosphate component comprises a sodium or potassium salt of tripolyphosphoric acid, e.g., the monosodium salt, the disodium salt, the trisodium salt, the tetrasodium salt, and the pentasodium salt thereof, and the corresponding potassium salts. Most preferably, the polyphosphate component comprises potassium tripolyphosphate.

In embodiments employing both a zinc-containing pigment and a polyphosphate component, the polyphosphate component may be employed in any suitable amount. Preferably, the polyphosphate component is employed in an amount effective for increasing the aged wet adhesion (as measured by the wet adhesion test described herein) of the coating mastic or caulking composition relative to an otherwise identical mastic or caulking composition in the absence of such component. Detectable enhancement of aged wet adhesion is found in many compositions of this invention at a concentration of polyphosphate component corresponding to a $PO_3:Zn$ ratio as low as 0.01:1 gram-equivalent of $PO_3$ therein per one gram-atom of zinc in the zinc-containing pigment. Generally, however, the ratio will be at least about 0.02:1, typically at least about 0.05:1, and, more typically, at least about 0.1:1. Much higher $PO_3:Zn$ ratios can be employed. Thus, such ratio will usually be from about 0.02:1 to about 5:1 or, more typically, about 0.05:1 to about 3:1 on the same basis. Surprisingly, very significant increases in aged wet adhesion can be achieved at concentrations of polyphosphate component corresponding to a $PO_3:Zn$ ratio below 2:1 and even below 1:1 on the same basis. Hence, preferred concentrations of polyphosphate component in many of the compositions of this invention correspond to a $PO_3:Zn$ ratio from about 0.05:1 to about 2:1 and, more preferably, from about 0.1:1 to about 1:1 on the same basis.

The invention is further described by the following examples wherein Examples 1, 4, 5, 6, 8, 9, 10, and 11 are illustrative of specific modes of practicing the invention. Examples 4–6 and 8–11 illustrate embodiment mastic compositions of the invention which include a zinc-containing pigment and a polyphosphate component, with Examples 9–11 illustrating, inter alia, wet adhesion for such compositions after aging. The examples are not intended as limiting the scope of the invention as defined by the appended claims. All parts, percents and other amounts given throughout this disclosure, including the examples which follow and the appended claims, are by weight unless other indicated.

EXAMPLE 1

This example illustrates, inter alia, preparation of a functional monomer-containing polymer in accordance with this invention. A monomer pre-emulsion is formed by emulsifying 21.5 parts water, 0.77 part acrylamide, 3.55 parts octylphenol-poly(ethyleneoxy)ethanol sulfate sodium salt (35 percent concentration), 84.86 parts butyl acrylate, 7.00 parts styrene, 4.83 parts acetoacetoxyethylmethacrylate (AAEMA), and 2.54 parts acrylic acid. A stirred reactor is purged with a nitrogen atmosphere, and 55.0 parts water and 1.9 parts octylphenoxy-poly(ethyleneoxy)ethanol (25 percent) are added and heated to 92° C. 10.8 parts of the monomer pre-emulsion are then charged to the heated reactor and 0.0083 part of a preformed catalyst solution containing 3 percent potassium persulfate in distilled water is added. The resulting mixture is maintained at 92° C. with agitation for 15 minutes after which the pre-emulsion and catalyst solutions are continuously fed to the reactor for 3 hours and 3.5 hours, respectively, at rates sufficient to consume both feeds completely. 14.3 parts of the 3 percent potassium persulfate catalyst solution are employed throughout the entire run. After monomer and catalyst feeds are terminated, the product is cooled and the pH of the resulting emulsion is adjusted to 8.5 with ammonia.

EXAMPLE 2

The operation described in Example 1 is repeated with the exception that the polymer is prepared without the acetoacetoxyethylmethacrylate monomer. The polymer pre-emulsion contains 0.81 weight part acrylamide, 89.1 weight parts butylacrylate, 7.36 weight parts styrene and 2.67 weight parts acrylic acid. Catalyst composition and reaction conditions are otherwise as defined in Example 1.

EXAMPLE 3

The operation described in Example 1 is again repeated with the exception that Sipomer WAM$^R$, a wet adhesion monomer available from Alcolac Inc., Baltimore, Maryland, is substituted for the acetoacetoxyethylmethacrylate monomer. Thus, the monomer pre-emulsion contains 0.77 parts acrylamide, 84.86 parts butylacrylate, 7.00 parts styrene, 4.83 parts Sipomer WAM and 2.54 parts acrylic acid. Catalyst composition, concentrations and other reaction conditions are as defined in Example 1.

EXAMPLE 4

Elastomeric coating mastic compositions are prepared from the polymer emulsions described in Examples 1, 2 and 3 by intimately blending in a high shear blender the following ingredients added sequentially to the blender in the order indicated. Blending is continued after each addition until complete dispersion of the last added ingredient is achieved. The ingredients are added as follows: 82.7 parts latex emulsion, 0.9 part Nalco 2300$^R$ defoamer available from Nalco Chemical Company, Oakbrook, Illinois, 0.6 part polyethylene glycol (molecular weight 1200), 1.2 parts naphthol spirits, 7 parts water, 1.8 parts Tamol 850$^R$ dispersant, a sodium salt of a carboxylated polyelectrolyte available from Rohm and Haas, Inc., 0.4 part potassium tribasic pyrophosphate, 7.8 parts ethylene glycol, 21.1 parts Tronox CR-800$^R$ titanium dioxide pigment available from Kerr-McGee Chemical Co., Inc., 9.8 parts Kadox 515$^R$ zinc oxide pigment available from New Jersey Zinc, Inc., 7.0 parts mica (water ground 325 mesh), 112.4 parts Duramite$^R$ calcium carbonate available from Thompson-Weinman and Co., Inc., 2.2 parts Texanol$^R$ (2,2,4-trimethyl-1,3-pentenediol monoisobutyrate plasticizer and coalescing aid) available from Eastman Kodak, Inc., 0.9 part Nalco 2303$^R$ silicone containing vegetable oil defoamer available from Nalco Chemical Company, and 82.3 parts latex emulsion. This procedure is used to prepare separate elastomeric roof coatings from each of the latexes defined in Examples 1, 2 and 3 using identical proportions of each latex and other ingredients as defined in this example.

EXAMPLE 5

The 180° peel adhesion of the 3 mastic compositions formulated in Example 4 are evaluated under wet and dry conditions by the following procedures. The mastic composition is drawn down by a glass rod on a sample of high density, closed pore, polyurethane foam roofing insulation available from Standard Insulation Co., Charlotte, North Carolina having a density of 2.8 to 3.0 pounds per cubic foot and an "orange peel" finish. Two 1-inch by 10-inch strips of desized, broadcloth fabric (4.28 oz. per yard, AD/80 thread count) are then laid lengthwise over the mastic treated portion of the polyurethane substrate. When the compound has set to the point that no distortion of the test structure will occur, a thin (1/32-inch or less) coating of the mastic is applied over the cloth strips to protect against moisture and minimize adhesive failure between the cloth and the mastic test specimen. The test specimens are allowed to air-cure for seven days at 75° F. and 50% relative humidity and are then divided into two lots. One lot is tested for dry adhesion and the other lot is completely immersed in water at 75° F. for seven days. Immediately following after the seven day immersion, the wet-test specimens are removed and tested for wet adhesion values.

The cured samples are prepared for testing by cutting the cured cloth-mastic composite through to the substrate surface with a razor blade along the edges of the cloth strips. The test specimen is then placed in an Instron Tensile Tester, and the cloth is pulled back on itself at an angle of 180° to peel the compound from the test substrate. The rate of separation of the Instron jaws is maintained at 2 inches per minute throughout the test. If the cloth strip begins to peel away from the compound during the test, the strip is cut crosswise with a sharp razor blade at the point of separation to obtain separation at the interface between the test compound and the substrate surface. A minimum of five strips is tested for each condition i.e., dry and wet adhesion. Average peel strength (P) in pounds per inch is obtained during each test using the Instron integrator attachment and calculating as follows:

$$P = XS/X_o$$

where X is the cumulative integrator reading over the test. $X_o$ is the integrator reading when full scale load is applied, and S is full scale load in pounds. The results of these evaluations are reported in the following table.

TABLE 1

| Polymer of Example No. | Monomer, wt. % | Adhesive Strength, Lbs./In. Dry | Wet |
|---|---|---|---|
| 1 | AAEMA, 4.83 | 3.2$^a$ | 2.0$^a$ |
| 2 | None | 0.25$^b$ | 0.01$^b$ |
| 3 | Sipomer WAM$^R$, 4.83 | 0.40$^b$ | 0.03$^b$ |

$^a$ = cohesive failure of mastic.
$^b$ = adhesive failure at substrate surface.

EXAMPLE 6

A water-base polymer emulsion is prepared as described in Examples 1 through 3 with the following differences in reactor charge, pre-emulsion composition and catalyst feed. The reactor is initially charged with 55.18 parts water per hundred parts monomer and 1.91 parts per 100 parts monomer (PHM) octylphenoxypoly(ethyleneoxy)ethanol surfactant. The monomer pre-emulsion is formed by emulsifing, as described in Example 1, 21.51 PHM water, 0.94 PHM acrylamide, 3.55 PHM octylphenoxy poly (ethyleneoxy) ethanol sulfate, sodium salt, 91.24 PHM butyl acrylate, 1.88 PHM acrylonitrile, 0.94 PHM acrylic acid, 4.72 PHM acetoacetoxyethylmethacrylate and 0.28 PHM methyl methacrylate. Total catalyst feed during the entire operation is 0.43 gram potassium persulfate dispersed in 13.86 PHM deionized water. The reactor is initially charged with the described reactor charge, purged with nitrogen, and gradually heated to 92° C. When the reactor contents reach 78° C., 2.0 PHM of the pre-emulsion is added, and, when reactor temperature reaches 85° C., 10.0 PHM of the catalyst solution is added. When reactor temperature reaches 92° C. the remainder of the pre-emulsion and catalyst feeds are added at constant rates over 3 and 3.5 hour periods, respectively. After catalyst feed is exhausted, the reactor contents are held at temperature for 2 hours.

EXAMPLE 7

The operation described in Example 6 is repeated with the exception that the acetoacetoxyethylmethacrylate monomer is eliminated from the monomer pre-emulsion feed, and the respective amounts of the remaining pre-emulsion ingredients are increased proportionately to obtain a total amount of pre-emulsion equal to that employed in Example 6. Reactor charge, pre-emulsion and catalyst feed compositions and operating conditions are otherwise as described in Example 6.

EXAMPLE 8

Coating mastic compositions are prepared employing the polymer emulsions described in Examples 6 and 7 using the procedures and compositions described in Example 4. The resulting mastic compositions are evaluated for peel adhesion as described in Example 5 and for tensile strength and elongation by the following procedures.

Tensile strength and elongation are determined by applying the mastic to a Teflon-Coated plate and allowing it to cure for 14 days for tensile strength evaluations and 28 days for elongation values. The mastic samples are inverted after 7 days to promote thorough curing. When curing is complete, the specimens are cut with a dumbbell-shaped dye measuring 3 inches long by ⅜ inch wide having a neck width of ¼ inch. Tensile strength is then determined using an Instron Tensile Tester by clamping opposite ends of the dumbbell-shaped mastic sample in the opposing jaws of the tester at an initial jaw separation of 0.5 inch and a jaw separation speed of 0.2 inch per minute. The force applied to the sample by the tester at the point of sample failure is divided by initial sample cross section at the narrowest portion of the dumbbell-shaped specimen to obtain tensile strength in pounds per square inch. Elongation is determined by dividing exposed sample length (Instron jaw separation) at the point of failure by initial sample length (initial jaw separation) and multiplying by 100 to obtain elongation expressed in percent.

Tensile strength and elongation values for the described mastic samples are reported in Table 2.

TABLE 2

| Polymer of Example No. | Monomer, Wt. % | Tensile, psi. | Elongation, % | Wet Adhesion, lbs. |
|---|---|---|---|---|
| 6 | AAEMA 4.72 | 115 | 63 | 2 |
| 7 | None | 53 | 238 | 0.5 |

EXAMPLE 9

An elastomeric coating mastic composition is prepared from a total of 351.6 parts of a polymer emulsion prepared in accordance with the procedure described in Example 1, except that the amount of each ingredient employed in Example 1 is increased by a factor of 1.79. The composition is prepared by intimately blending in a high shear blender the following ingredients added sequentially shear blender the following ingredients added sequentially to the blender in the order indicated. Blending is continued after each addition until complete dispersion of the last added ingredient is achieved. The ingredients are added as follows: 175.8 parts latex emulsion, 1.9 parts Nalco 2300$^R$ defoamer available from Nalco Chemical Company, Oakbrook, Illinois, 1.2 parts polyethylene glycol (molecular weight 1200), 2.6 parts naphthol spirits, 7 parts water, 4.1 parts Tamol 850$^R$ dispersant, a sodium salt of a carboxylated polyelectrolyte available from Rohm and Haas, Inc., 0.9 part potassium tripolyphosphate (KTPP), 17.4 parts ethylene glycol, 0.9 part of a biocide, 46.8 parts Tronox CR-800$^R$ titanium dioxide pigment available from Kerr-McGee Chemical Co., Inc., 21.8 parts Kadox 515$^R$ zinc oxide pigment available from New Jersey Zinc, Inc., 15.6 parts mica (water ground 325 mesh), 249.6 parts Duramite$^R$ calcium carbonate available from Thompson-Weinman and Co., Inc., 4.9 parts Texanol$^R$ (2,2,4-trimethyl-1,3-pentenediol monoisobutyrate plasticizer and coalescing aid) available from Eastman Kodak, Inc., 1.9 parts Nalco 2303$^R$ silicone containing vegetable oil defoamer available from Nalco Chemical Company, and another 175.8 parts latex emulsion.

EXAMPLE 10

The procedure of Example 9 is repeated except that the amount of potassium tripolyphosphate (KTPP) employed is increased five-fold from 0.9 part to 4.5 parts.

EXAMPLE 11

Portions of the unaged mastic compositions formulated in Examples 9 and 10 are evaluated for wet adhesion, i.e., 180° peel adhesion under wet conditions, using the wet-adhesion procedure of Example 5.

Another portion of each of these mastic compositions is aged by an accelerated aging procedure wherein the composition is placed in an air oven at a temperature of 120° F. for 3 weeks. The resulting heat-aged compositions are also evaluated for wet adhesion using the wet adhesion procedure of Example 5.

The wet adhesion results for these aged and unaged mastic compositions are set forth in Table 3.

TABLE 3

| Composition Example No. | KTPP$^a$ Parts | ZnO Parts | PO$_3$:Zn Ratio$^b$ | Adhesive Strength, Lbs./In. | |
|---|---|---|---|---|---|
| | | | | Wet Unaged | Wet Aged |
| 9 | 0.9 | 21.8 | 0.022 | 2.0$^c$ | 0.5$^c$ |
| 10 | 4.5 | 21.8 | 0.112 | >6$^c$ | 2.3$^d$ |

$a$ = potassium tripolyphosphate.
$b$ = ratio of gram-equivalents of $(PO_3)^-$ in the KTPP per gram-atom of Zn.
$c$ = adhesive failure at substrate surface.
$d$ = mixed cohesive failure of mastic and adhesive failure at substrate surface.

The data show, inter alia, unaged and aged wet adhesion values which are acceptable for some mastic and caulking applications at a KTPP level corresponding to a PO$_3$:Zn ratio of 0.022 gram-equivalent of $(PO_3)^-$ in the KTPP per gram-atom of zinc in the ZnO pigment. The data further show that increasing the amount of KTPP results in a substantial increase in the wet adhesion for the aged mastic compositions; namely, nearly a five-fold increase in aged wet adhesion to 2.3 pounds per inch at a PO$_3$:Zn ratio of 0.112 gram -equivalent of $(PO_3)^-$ in the KTPP per gram-atom of zinc, a superior aged wet adhesion for more demanding mastic and caulking applications where aged wet adhesion of at least 1, 1.5 or even 2 pounds per inch is required.

The disclosure of the aforesaid U.S. Pat. application Ser. No. 903,779 filed Sept. 4, 1986, is incorporated herein by reference in its entirety.

Regarding the following above-described radicals, typically: $R_1$ and $R_3$ each contain no more than 40 carbon atoms, and $R_4$, $R_5$, $R_6$ and $R_7$ each contain no more than 20 carbon atoms. More typically: $R_1$ and $R_3$ each contain no more than 20 carbon atoms, $R_4$, $R_5$, and $R_6$ each contain no more than 10 carbon atoms, and $R_7$ contains no more than 6 carbon atoms.

As indicated above, in the foregoing discussion, the term "organic radical" refers to any group containing at least one carbon atom. Included therefore are aliphatic and aromatic radicals, whether containing only hydrogen and carbon (i.e., hydrocarbon radicals) or further containing heteroatoms such as oxygen, phosphorus, sulfur, and nitrogen and/or an inorganic substituent such as chlorine, bromine, iodine, etc. Accordingly, such radicals include, for example, substituted and unsubstituted alkyl, aryl, arylalkyl, alkylaryl, alkyloxy, aryloxy, arylalkyloxy, alkenyl, alkenyloxy, alkynyl, alkynyloxy, and arylalkenyl radicals and hetero-atom substituted hydrocarbyl radicals wherein the heteroatoms are selected from the group consisting of oxygen, phosphorus, sulfur, and nitrogen atoms.

While particular embodiments of the invention have been described, it will be understood, of course, that the invention is not limited to these embodiments, since many obvious modifications can be made, and it is intended to include within this invention any such modifications as will fall within the scope of the appended claims. For instance, solutions and emulsions of the described polymers containing the described functional monomers have exceptionally good adhesion to relatively non-adherent surfaces (surfaces which are particularly difficult to adhere to) such as polyurethane and smooth surfaced elastomeric and plastic materials such as ethylene-propylene-diene elastomer films, coatings and other articles even in the absence of the pigments and mastic filler materials described hereinabove, and they are particularly useful for coating and protecting closed pore foamed polyurethene insulation. Accordingly, these and all other such modifications, alternatives and embodiments falling within the spirit and scope of the appended claims are embraced within the present invention.

What is claimed is:

1. A coating mastic or caulking composition, which comprises (a) a polymer having a $T_g$ of about $-50°$ C. to about $-10°$ C. and comprising at least one polymerized functional monomer of the formula:

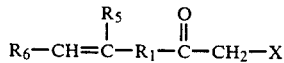

in which $R_1$ is a divalent organic radical of at least 3 atoms in length, $R_5$ and $R_6$ are independently selected from hydrogen, hydroxy, halo, thio, amino or monovalent organic radicals, and X is $-CO-R_4$ or $-CN$ wherein $R_4$ is hydrogen or a monovalent organic radical, (b) a zinc-containing pigment; and (c) a polyphosphate anion, wherein the polyphosphate anion is present in a concentration corresponding to a $PO_3$:Zn ratio of at least 0.05:1 gram-equivalent of $PO_3$ per gram-atom of zinc.

2. The composition defined in claim 1 wherein the composition has a total non-volatile solids content of about 60 to about 90 weight percent based on the total weight of the composition and said polymer is water insoluble, said solids content comprising (a) said polymer in an amount from about 15 to about 75 weight percent based on the total weight of the solids, and (b) solid matter other than said polymer in an amount from about 25 to about 85 weight percent based on the total weight of the solids, said solid matter comprising said zinc-containing pigment.

3. The composition defined in claim 1 wherein said zinc-containing pigment is selected from the group consisting of zinc oxide, zinc sulfide, zinc yellow, basic zinc chromate, zinc molybdate, zinc ferrite and zinc dust.

4. The composition defined in claim 1 wherein said polyphosphate anion is the anion moiety of a polyphosphate salt selected from the group consisting of (a) salts of linear polyphosphoric acids of the formula:

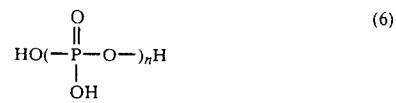

where n is an integer from 2 to about 20 or (b) salts of cyclic polyphosphoric acids of the formula:

where m is an integer from 3 to about 18.

5. The composition defined in claim 4 wherein said salts of linear polyphosphoric acids are selected from the group consisting of salts of pyrophosphoric acid, tripolyphosphoric acid, tetraphosphoric acid, pentaphosphoric acid, hexaphosphoric acid, and mixtures thereof, and said salts of cyclic polyphosphoric acids are selected from the group consisting of salts of trimetaphosphoric acid, tetrametaphosphoric acid, hexametaphosphoric acid, and mixtures thereof.

6. The composition defined in claim 5 wherein the polyphosphate anion is the anion moiety of the polyphosphate salt selected from the group consisting of the mono-, di-, and higher poly-alkali metal and ammonium salts of (a) said linear polyphosphoric acid and (b) said cyclic polyphosphoric acid.

7. The composition defined in claim 6 wherein the polyphosphate anion is the anion moiety of the polyphosphate salt selected from the group consisting of the sodium and potassium salts of pyrophosphoric acid and tripolyphosphoric acid.

8. The composition defined in claim 6 wherein the polyphosphate anion is the anion moiety of sodium or potassium tripolyphosphate.

9. The composition defined in claim 1 wherein the polyphosphate anion is present in an concentration corresponding to a $PO_3$:Zn ratio of at least 0.1:1 gram-equivalent of $PO_3$ per gram-atom of zinc.

10. The composition defined in claim 1 wherein the $PO_3$:Zn ratio is from about 0.05:1 to about 5.1.

11. The composition defined in claim 1 wherein said polymer is selected from the group consisting of (a) conjugated diolefin polymers comprising at least about 30 weight percent of one or more conjugated diene monomers having 4 to about 8 carbon atoms and 0 to about 70 weight percent of one or more alkenyl substituted monoaromatic monomers;

(b) olefin ester interpolymers comprising at least about 1 weight percent of a monoolefin monomer having up to about 4 carbon atoms and at least about 40 weight percent of an alkenyl or alkenol ester of a saturated carboxylic acid;

(c) olefinically unsaturated carboxylic acid ester polymers comprising at least about 40 weight percent polymerized olefinically unsaturated carboxylic acid ester monomers;

(d) alkenyl ether polymers comprising at least about 30 weight percent alkenyl ether monomer units; and (e) combinations thereof.

12. The composition defined in claim 1 which comprises a water-base mastic emulsion of said total solids dispersed in water, said total solids comprising about 40 to about 70 weight percent of said polymer, and said mastic having, after aging in air at a temperature of 120° F. for 3 weeks, a wet adhesion to closed-foam polyurethane of at least about 1 pound per inch.

13. The composition defined in claim 1 comprising about 40 to about 70 weight percent of said polymer, about 30 to about 60 weight percent solid matter other than said polymer, and said solid matter other than said polymer comprises at least about 5 weight percent of an opaque, reflective zinc-containing pigment.

14. The composition defined in claim 1 wherein said composition is a water-base emulsion, said total non-volatile solids comprise about 40 to about 70 weight percent of said polymer and about 30 to about 60 weight percent of solid matter other than said polymer, said polymer has a $T_g$ of about $-50°$ C. to about $-20°$ C., and said pigment comprises zinc oxide.

15. The composition defined in claim 1 which comprises a dispersion of said total solids in water, and said composition comprises at least about 10 weight percent water.

16. The composition defined in claim 1 wherein said total solids comprises about 10 to about 70 weight percent of filler materials other than pigment.

17. The composition defined in claim 1 wherein said polymer comprises about 0.1 to about 40 weight percent of said functional monomer.

18. The composition defined in claim 1 wherein said polymer comprises a member selected from the group consisting of acrylic acid, itaconic acid, and combinations thereof.

19. The composition defined in claim 1 wherein said polymer comprises about 0.1 to about 10 weight percent of said functional monomer.

20. The composition defined in claim 1 wherein $R_1$ is a divalent organic radical 3 to about 40 atoms in length, and X is —CO—$R_4$.

21. The composition defined in claim 1 wherein said polymer comprises at least about 0.1 weight percent of a least one functional monomer having the formula:

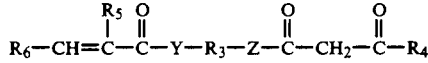

wherein $R_4$, $R_5$, and $R_6$ are as defined in claim 1, $R_3$ is a divalent organic radical, Y and Z are independently selected from the group consisting of O, S, and $NR_7$, and $R_7$ is H or monovalent organic radical.

22. The composition defined in claim 21 wherein $R_4$ is hydrogen or alkyl having up to about 8 carbon atoms, and $R_3$ is a divalent organic radical at least 2 atoms in length.

23. The composition defined in claim 22 wherein each of Y and Z is O.

24. The composition defined in claim 1 wherein said polymer comprises about 0.1 to about 10 weight percent of a member selected from the group consisting of acetoacetoxyethylmethacrylate, acetoacetoxyethylacrylate, and combinations thereof.

25. The composition defined in claim 1 wherein said polymer comprises at least about 0.1 weight percent of said functional monomer and at least about 60 weight percent of polymerized olefinically unsaturated carboxylic acid ester monomers selected from the group consisting of esters of acrylic acid and methacrylic acid having 4 to about 17 carbon atoms and combinations thereof.

26. The composition defined in claim 25 wherein said polymer further comprises a polymerized, olefinically unsaturated carboxylic acid monomer.

27. A coating mastic or caulking composition having a total non-volatile solids content of about 60 to about 90 weight percent based on the total weight of the composition, said solids content comprising (a) a water insoluble polymer in an amount from about 15 to about 75 weight percent based on the total weight of the solids, and (b) solid matter other than said polymer in an amount from about 25 to about 85 weight percent based on the total weight of the solids, said polymer having a $T_g$ of about $-50°$ C. to about $-10°$ C. and comprising at least one polymerized functional monomer of the formula:

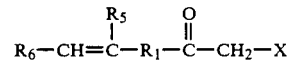

in which $R_1$ is a divalent organic radical of at least 3 atoms in length, $R_5$ and $R_6$ are independently selected from hydrogen, hydroxy, halo, thio, amino or monovalent organic radicals, and X is —CO—$R_4$ or —CN wherein $R_4$ is hydrogen or a monovalent organic radical, said solid matter other than said polymer comprising a zinc-containing pigment, the composition comprising a polyphosphate component selected from the group consisting of polyphosphoric acids and salts thereof in an amount effective for increasing the aged wet adhesion to closed foam polyurethane.

28. A coating mastic or caulking composition, which comprises (a) a polymer having a $T_g$ of about $-50°$ C. to about $-10°$ C. and comprising at least one pendant functional group of the formula:

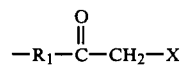

in which $R_1$ is a divalent organic radical of at least 3 atoms in length, and X is —CO—$R_4$ or —CN wherein $R_4$ is hydrogen or a monovalent organic radical, (b) a zinc-containing pigment, and (c) a polyphosphate anion.

29. The composition defined in claim 28 wherein the composition has a total non-volatile solids content of about 60 to about 90 weight percent based on the total weight of the composition and said polymer is water insoluble, said solids content comprising (a) said polymer in an amount from about 15 to about 75 weight percent based on the total weight of the solids and (b) solid matter other than said polymer in an amount from about 25 to about 85 weight percent based on the total weight of the solids, said solid matter comprising said zinc-containing pigment.

30. The composition defined in claim 28 wherein $R_1$ is of the formula:

$$-\overset{O}{\underset{\|}{C}}-Y-R_3-Z-$$

Y and Z are independently selected from the group consisting of oxygen, sulfur, and $NR_7$, $R_3$ is a divalent organic radical at least about 2 atoms in length, and $R_7$ is H or hydrocarbyl.

31. The composition defined in claim 28 wherein $R_1$ is an ethylene radical, X is $CO-R_4$, $R_4$ is a methyl radical, said polymer comprises about 0.1 to about 10 percent of said functional monomer, said solids content comprises said polymer in an amount from about 40 to about 70 weight percent, said polymer comprises at least about 0.1 weight percent of a polymerizable acid selected from the group consisting of olefinically unsaturated carboxylic acids having up to about 10 carbon atoms, sulfoalkyl esters of said olefinically unsaturated acids, and combinations thereof, the composition having, after aging in air at a temperature of 120° F. for 3 weeks, a wet adhesion to closed-foam polyurethane of at least about 1 pound per inch.

32. A roofing mastic composition, which comprises a water base latex comprising (a) a polymer having a $T_g$ of about $-50°$ C. to about $-10°$ C. and comprising at least one pendant functional group of the formula:

$$-R_1-\overset{O}{\underset{\|}{C}}-CH_2-X$$

in which $R_1$ is a divalent organic radical of at least 3 atoms in length, and X is $-CO-R_4$ or $-CN$ wherein $R_4$ is hydrogen or a monovalent organic radical, (b) a zinc-containing pigment, and (c) a polyphosphate component selected from the group consisting of polyphosphoric acids and salts thereof.

33. The composition defined in claim 32 wherein the composition has a total non-volatile solids content of about 60 to about 90 weight percent based on the total weight of the composition and said polymer is water insoluble, said solids content comprising (a) said polymer in an amount from about 15 to about 75 weight percent based on the total weight of the solids and (b) solid matter other than said polymer in an amount from about 25 to about 85 weight percent based on the total weight of the solids, said solid matter comprising said zinc-containing pigment.

34. A mixture comprising (I) a zinc-containing pigment, (II) a polyphosphate anion, the polyphosphate anion being the anion moiety of a polyphosphate salt, and (III) a polymer containing at least one pendant functional group of the formula:

$$-R_1-\overset{O}{\underset{\|}{C}}-CH_2-X$$

in which $R_1$ is a divalent organic radical of at least 3 atoms in length and X is $-CO-R_4$ or $-CN$ wherein $R_4$ is hydrogen or a monovalent organic radical.

35. The mixture defined in claim 34 wherein said polymer contains at least about 40 weight percent of at least one polymerized olefinically unsaturated carboxylic acid ester monomer.

36. The composition of claim 1 wherein the $PO_3$:Zn ratio is about 0.05:1 to about 3:1.

37. The composition of claim 1 wherein the $PO_3$:Zn ratio is about 0.05:1 to about 2:1.

38. The composition of claim 1 wherein the $PO_3$:Zn ratio is about 0.1:1 to about 5:1.

39. The composition of claim 1 wherein the $PO_3$:Zn ratio is about 0.1:1 to about 3:1.

40. The composition of claim 1 wherein the $PO_3$:Zn ratio is about 0.1:1 to about 2:1.

* * * * *